(12) United States Patent
Yamaguchi

(10) Patent No.: US 6,269,645 B1
(45) Date of Patent: Aug. 7, 2001

(54) POWER PLANT

(75) Inventor: Satarou Yamaguchi, Kasugai (JP)

(73) Assignee: YYL Corporation, Tokyo (JP)

( * ) Notice: Subject to any disclaimer, the term of this patent is extended or adjusted under 35 U.S.C. 154(b) by 0 days.

(21) Appl. No.: 09/462,940

(22) PCT Filed: May 13, 1999

(86) PCT No.: PCT/JP99/02473

§ 371 Date: Jan. 14, 2000

§ 102(e) Date: Jan. 14, 2000

(87) PCT Pub. No.: WO99/58820

PCT Pub. Date: Nov. 18, 1999

(30) Foreign Application Priority Data

May 14, 1998 (JP) .................................................. 10-150657

(51) Int. Cl.$^7$ .................................................. F01K 7/34
(52) U.S. Cl. .................................. 60/653; 60/654; 60/679
(58) Field of Search ............................ 60/651, 653, 659, 60/670, 679

(56) References Cited

U.S. PATENT DOCUMENTS

| 4,274,259 | * | 6/1981 | Silvestri, Jr. ...................... 60/653 X |
| 4,372,125 | * | 2/1983 | Dickenson .......................... 60/653 X |
| 4,476,683 | * | 10/1984 | Shah et al. .......................... 60/653 X |
| 6,029,454 | * | 2/2000 | Kefer et al. ............................. 60/653 |

FOREIGN PATENT DOCUMENTS

| 59-147907 | 8/1984 | (JP) . |
| 60-043083 | 3/1985 | (JP) . |
| 63-137588 | 9/1988 | (JP) . |
| 2-238104 | 9/1990 | (JP) . |
| 02261079 | 10/1990 | (JP) . |
| 2-264101 | 10/1990 | (JP) . |
| 06188463 | 7/1994 | (JP) . |
| 07119908 | 5/1995 | (JP) . |
| 08098569 | 4/1996 | (JP) . |
| 08125232 | 5/1996 | (JP) . |
| 08139373 | 5/1996 | (JP) . |
| 08163881 | 6/1996 | (JP) . |
| 08251957 | 9/1996 | (JP) . |
| 09014625 | 1/1997 | (JP) . |
| 09023669 | 1/1997 | (JP) . |
| 09117169 | 5/1997 | (JP) . |
| 09149666 | 6/1997 | (JP) . |
| 09163773 | 6/1997 | (JP) . |
| 09275692 | 10/1997 | (JP) . |
| 10018810 | 1/1998 | (JP) . |
| 10163538 | 6/1998 | (JP) . |
| 10190073 | 7/1998 | (JP) . |
| 10201269 | 7/1998 | (JP) . |
| 10271861 | 10/1998 | (JP) . |

* cited by examiner

Primary Examiner—Hoang Nguyen
(74) Attorney, Agent, or Firm—Ladas & Parry

(57) ABSTRACT

The power plant according to the present invention improves the efficiency of conversion from thermal energy to electrical energy, and is provided with a first thermoelectric conversion element that generates electric power by using a difference in temperature between a temperature inside a boiler combustion chamber and a temperature of water supplied to the boiler from a feed water heater, and a second thermoelectric conversion element installed on the feed water heater that generates electric power by using a difference in temperature between a temperature of steam supplied from a turbine and the temperature of water supplied from a condenser.

12 Claims, 17 Drawing Sheets

POWER PLANT

TECHNICAL FIELD

The present invention relates to a power plant, and more particularly, to a power plant for converting thermal energy into electrical energy.

BACKGROUND TECHNOLOGY

In recent years, technology for converting thermal energy into electrical energy has been widely researched. However, it is a fact that energy conversion utilizing the thermoelectric effect is not fully utilized in such major energy conversion systems as thermal power plants and nuclear power plants.

A brief explanation of the reason for this under-utilization will now be given. FIG. 1 is a schematic representation of an energy flow inside a thermoelectric conversion element. It should be noted that this diagram is taken from Echigo's thesis titled "What Is the Problem with Thermoelectric Conversion Technology?" (Energy Shigen Gakkai, July 1995, p. 43). Additionally, the breadth of the diagram is proportional to the size of the energy flux.

As shown in FIG. 1, the majority of the heating heat flux $q_H$ is in fact expended in useless heat transfer flux $q_{HC}$ unrelated to thermoelectric conversion, with an effective Peltier heat $q_{HP}$ relegated to a supporting role. Here, if the figure of merit is z and the high-temperature edge temperature is $T_H$, with $z \cdot T_H \approx 1$, then the heat transfer flux $q_{HC}$ can become approximately twice the Peltier heat $q_{HP}$ and moreover, of the true Peltier heat from which the Peltier heat discharge has been subtracted ($q_{HP}-q_{LP}$), approximately half becomes Joule heat $q_J$. Accordingly, essentially that which is converted into electric power is heat P, so the conversion efficiency is low and the temperature, which is low, becomes even lower.

If, here, for example, the temperature of the low-temperature side is $T_L=300°$ C. and $T_H=1300°$ C., then the maximum efficiency is 13.7%. Moreover, even assuming a dramatic advance in materials such that $z \cdot T_H \approx 2$, the maximum efficiency will still be no more than 22.0%. This point is the biggest problem with thermal power generation, and the inability of thermal power alone to compete with other power generating facilities such as gas turbines and fuel cells is the largest factor impeding its technological development.

FIG. 2 shows a figure of merit for various types of thermoelectric material. The vertical axis represents the figure of merit and the horizontal axis represents the temperature. It can be understood from FIG. 2 that the energy conversion rate of thermoelectric material is at most approximately 10%. Accordingly, further research and development is required for the development of thermoelectric element material.

FIG. 3 shows the temperature dependency of a coefficient of thermal conductivity of a packed skutterudite alloy. As shown in FIG. 3, a packed skutterudite alloy having such compositions as $LaFe_3CoSb_{12}$ and $CeFe_3CoSb_{12}$ has a coefficient of thermal conductivity that is an order of magnitude smaller than the coefficient of thermal conductivity of a binary skutterudite alloy $CoSb_3$ having superior electrical characteristics, and at ordinary temperature is about the same as glass-type silica ($SiO_2$).

FIG. 4 shows the temperature dependency of a dimensionless figure of merit ZT in a substantially optimized sample of packed skutterudite alloy. The black dots in FIG. 4 represent the above-described temperature dependency, assuming a single parabolic band and acoustic phonon scattering and calculated on the basis of carrier density at measured room temperature. Additionally, the measured value at high temperature of the coefficient of thermal conductivity is also reflected in these calculations.

Here, there is no theoretical upper limit to the value of the dimensionless figure of merit ZT and there are possible candidates whose dimensionless figure of merit ZT is about 3–4. However, such a material has not at present been found.

It should be noted that FIG. 3 and FIG. 4 were cited in "Parity", Vol.12 No. 10 1997-10.

At the same time, power generation systems combining a gas turbine and a steam turbine have been studied as a technology for converting thermal energy into electrical energy, and a variety of combined cycle power generating systems with improved power generating efficiency have been proposed.

In a steam turbine, the maximum temperature (the temperature at the critical pressure of water) is 566° C. and the combustion gas temperature is approximately 1,500° C. or more, so as a heat engine enthalpy is not utilized in the range 1,500° C.–566° C. Accordingly, combined cycle power generating systems can be said to be systems designed with this factor, which reduces power generating efficiency, in mind.

It should be noted that the shaft configuration of a combined cycle power generating system (also called simply a "combined system") may be either a single-shaft type, in which one gas turbine and one steam turbine are linked along the same shaft in the exhaust heat recovery cycle, or a multiple-shaft type, in which the gas turbines and the steam turbines are operated using separate shafts, with the type selected depending on the purpose, operating methods and installation conditions.

FIG. 5 is a diagram for illustrating the combined cycle power generating system of the conventional exhaust heat recovery type. As shown in FIG. 5, this conventional exhaust heat recovery type combined cycle power generating system comprises a gas turbine 19, an exhaust heat recovery boiler 21 connected to the gas turbine 19, a steam turbine 23 connected to the exhaust heat recovery boiler 21, a condenser 25 connected to the steam turbine 23, and a feed water pump 27 connected between the condenser 25 and the exhaust heat recovery boiler 21.

Here, as shown on page 126 of the Electrical Engineering Handbook, the higher the temperature of the gas turbine 19 the greater the thermal efficiency of the combined system overall.

In the system shown in FIG. 5, the gas turbine 19 is turned using the energy of gas heated to a high temperature of approximately 1,500° C. and at the same time the steam turbine, too, can be operated by using the exhaust gas to generate steam, so overall the power generating efficiency increases.

Additionally, as a steam turbine engine designed for improved thermoelectric conversion efficiency, a system using a reheating cycle in which all steam is removed from an intermediate drop of the turbine, reheated and once again sent to the turbine has conventionally been proposed. FIG. 6 is a heat balance diagram of an actual thermal power plant system utilizing this reheating cycle.

As shown in FIG. 6, after the high-temperature, high-pressure steam generated at the boiler 29 rotates a high-pressure turbine 31 it is once again heated by a reheating unit and fed to a medium-pressure turbine 33. Additionally, some of the steam forms as water on the blades of the turbine. This steam and water is cooled by the condenser 35 and returned to low-temperature, low-pressure water and fed to the feed water heater 37. The water supplied from the condenser 35 is reheated by the feed water heater 37, compressed once more by the feed water pump 39 and supplied to the boiler 29. It should be noted that at present the power generating efficiency of the thermal power plant is approximately 39%.

Ways to improve the technology for converting thermal energy into electrical energy have been considered from a variety of angles as described above. A description will now be given of the thermoelectric conversion technology utilized in energy conversion systems in thermal power plants.

FIG. 7 is a diagram for illustrating the conventional thermoelectric conversion element. As shown in FIG. 7, carbon 3 as the N-type semiconductor element and $B_4C$ (boron carbide) as the P-type semiconductor element are both joined to a heat-collecting metallic plate 1 made from W or Mo as the P-N junction electrode, with electrodes 7 positioned at the ends of the carbon 3 and boron carbide 5 opposite the heat-collecting metallic plate 1. An output voltage is then obtained from the potential difference generated at the two electrodes 7. It should be noted that water pipes 9 penetrate through-holes formed in each of the two electrodes 7.

According to this type of thermoelectric conversion element, if for example the temperature of the heat-collecting metallic plate 1 is 1,500° C. and the temperature of the electrodes 7 is 30° C., a maximum 8% thermal efficiency can be obtained. If the temperature of the heat-collecting metallic plate 1 is 1,500° C. and the temperature of the electrodes 7 is 600° C., then a maximum 4% thermal efficiency can be obtained.

FIG. 8 shows the structure of a conventional thermal power plant in which the thermoelectric conversion element shown in FIG. 7 has been included. As shown by the portion of FIG. 8 covered by slanted lines, the thermoelectric conversion elements 13 are installed in columns around the combustion chamber of the boiler 11 as shown in FIG. 7. The thermoelectric conversion elements 13 are arranged so that the heat-collecting metallic plates face the combustion chamber, and at the same time the water that has been supplied to the boiler 11 via the feed water pipe 17 circulates through the water pipes 9 shown in FIG. 7 and steam is generated. Then, this steam is supplied from an output port 15 of the boiler 11 to the steam turbine. Combustion gasses produced in the boiler 11 are discharged from a smokestack 12.

DISCLOSURE OF THE INVENTION

The present invention has as its object to provide a power plant having a higher rate of efficiency of conversion from thermal energy to electrical energy than conventionally.

The object of the present invention is achieved by a power plant for generating power using the thermal energy of combustion gas or steam, in which thermoelectric conversion elements are provided at at least two locations having different temperatures.

Additionally, the object of the present invention is also achieved by a power plant comprising:
  a boiler that heats pressurized water in a combustion chamber to produce steam;
  a turbine connected to the boiler that generates electricity by the work of the steam;
  a condenser connected to the turbine that cools and condenses the steam emitted from the turbine;
  a feed water heater that preheats water supplied to the boiler from the condenser by using a part of the steam to work in the turbine;
  a first thermoelectric conversion element installed around the combustion chamber of the boiler and that generates electric power by using a difference in temperature between a temperature of an interior of the combustion chamber and a temperature of the water exhausted from either the feed water heater or the condenser; and
  a second thermoelectric conversion element installed on the feed water heater and that generates electric power by using a difference in temperature between the temperature of the part of the steam supplied from the turbine and a temperature of the water supplied from the condenser.

Additionally, the object of the present invention is also achieved by the power plant further comprising:
  preheating means provided between the feed water heater and the boiler for preheating pressurized water supplied to the boiler; and
  a third thermoelectric conversion element installed on the preheating means and that generates electric power by using the difference in temperature between the temperature of combustion gas supplied from the combustion chamber for preheating the pressurized water and the temperature of the pressurized water supplied to the preheating means.

Additionally, the object of the present invention is also achieved by the power plant further comprising:
  an air preheater that preheats air supplied to the inside of the combustion chamber; and
  a fourth thermoelectric conversion element installed on the air preheater that generates electric power by using the difference in temperature between the temperature of air supplied to the air preheater and the temperature of combustion gas supplied from the combustion chamber for preheating the air.

Additionally, the object of the present invention is also achieved by the power plant further comprising:
  a fifth thermoelectric conversion element that generates electric power by using the difference in temperature between the temperature of fuel supplied to the combustion chamber and the temperature of either the air preheated by the air preheater or the water exhausted from the feed water heater.

Additionally, the object of the present invention is also achieved by a power plant wherein the first thermoelectric conversion element comprises:
  a first electrode provided so as to face an inside of the combustion chamber;
  an N-type semiconductor, one end of which is joined to the first electrode;
  a P-type semiconductor, one end of which is joined to the first electrode;
  a second electrode provided on the other ends of the N-type semiconductor and the P-type semiconductor;
  a water pipe running from the feed water heater to the turbine and installed so as to penetrate the second electrode; and
  a heat insulator sandwiched between the water pipe and the second electrode.

Additionally, the object of the present invention is also achieved by the power plant further comprising:
  a carburetor that vaporizes liquefied LNG and supplies the LNG to the boiler; and a third thermoelectric conversion element provided on the carburetor and that generates electric power by using the difference in temperature between the temperature of the LNG and the temperature of water led to the carburetor in order to vaporize the LNG.

Additionally, the object of the present invention is also achieved by a power plant having a plurality of steam turbines with different operating pressure ranges, the power plant comprising:

a boiler that heats pressurized water inside a combustion chamber to generate steam; and a first thermoelectric conversion element installed around the combustion chamber of the boiler and that generates electric power by using the difference in temperature between the temperature of the interior of the combustion chamber and the temperature of either water or steam exhausted from any one of the steam turbines.

Additionally, the object of the present invention is also achieved by the power plant further comprising:

a condenser connected to the steam turbines that cools and condenses steam emitted from the steam turbines;

a feed water heater that preheats water supplied to the boiler from the condenser by using a part of the steam to work in the steam turbines; and a second thermoelectric conversion element that generates electric power using the difference in temperature between the temperature of steam emitted from the steam turbines and the temperature of the water exhausted from either the condenser or the feed water heater.

Additionally, the object of the present invention is also achieved by a power plant wherein water or steam exhausted from any one of the steam turbines and which has taken heat from the first thermoelectric conversion element is again led to the feed water heater.

Additionally, the object of the present invention is also achieved by the steam that has imparted heat to the second thermoelectric conversion element being led to the condenser.

Additionally, the object of the present invention is also achieved by a power plant wherein the second thermoelectric conversion element is made from PbTe-type or CoSb-type material.

Additionally, the object of the present invention is also achieved by the power plant further comprising a second thermoelectric conversion element that generates electric power by using the difference in temperature between the temperature of steam emitted from the steam turbines and the temperature of water existing in the natural environment.

Additionally, the object of the present invention is also achieved by a power plant combining a gas turbine and a steam turbine, the power plant comprising a thermoelectric conversion element that generates electric power by using the difference in temperature between the temperature of gas supplied to the gas turbine and the temperature of water exhausted from the steam turbine.

The chief advantage of the present invention is the increase in power generating efficiency of the plant overall, accomplished by providing thermoelectric conversion elements that generate electric power by using temperature differences appearing in various parts of the conventional power plant. This is essentially a process unattended by energy loss.

Additionally, another advantage of the present invention is the ability to increase the operating power generating efficiency of the plant overall without increasing the maintenance burden, accomplished by providing thermoelectric conversion elements that do not have movable parts like a gas turbine does.

THE PREFERRED EMBODIMENTS OF THE INVENTION

Figure 1:
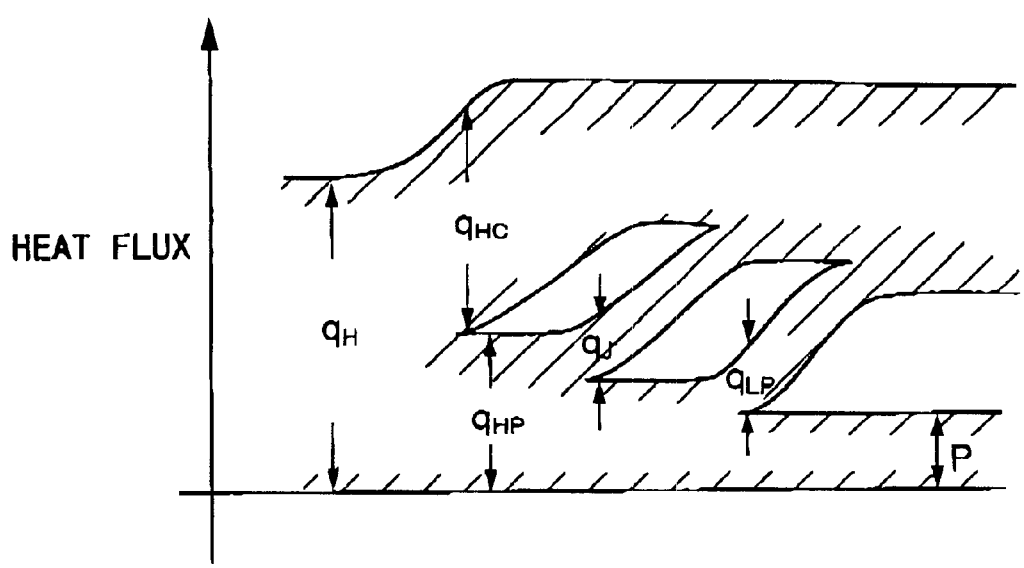
FIG. 1 is a schematic representation of an energy flow inside a thermoelectric conversion element.
Figure 2:
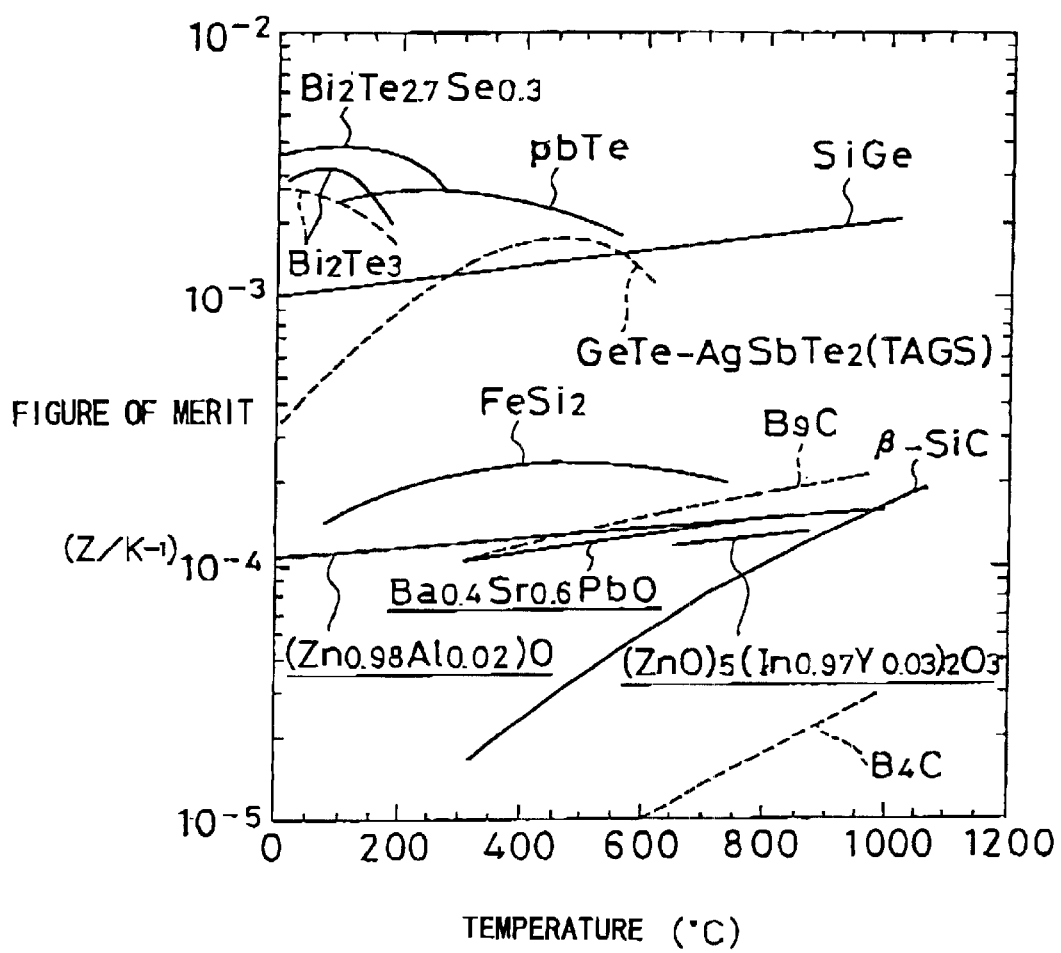
FIG. 2 shows a figure of merit for various types of thermoelectric fuels.
Figure 3:
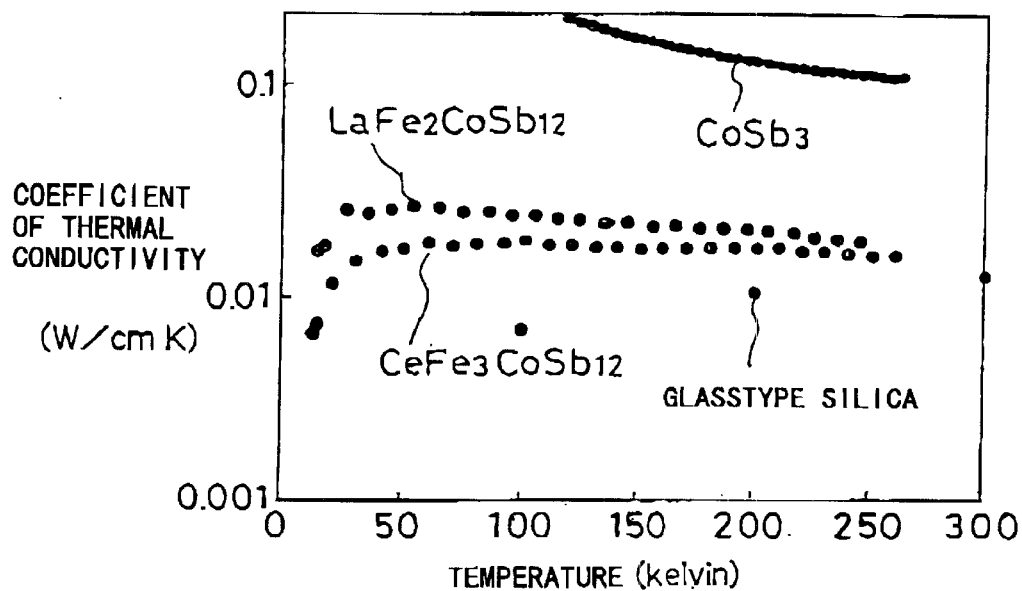
FIG. 3 shows the temperature dependency of a coefficient of thermal conductivity of a packed skutterudite alloy.
Figure 4:
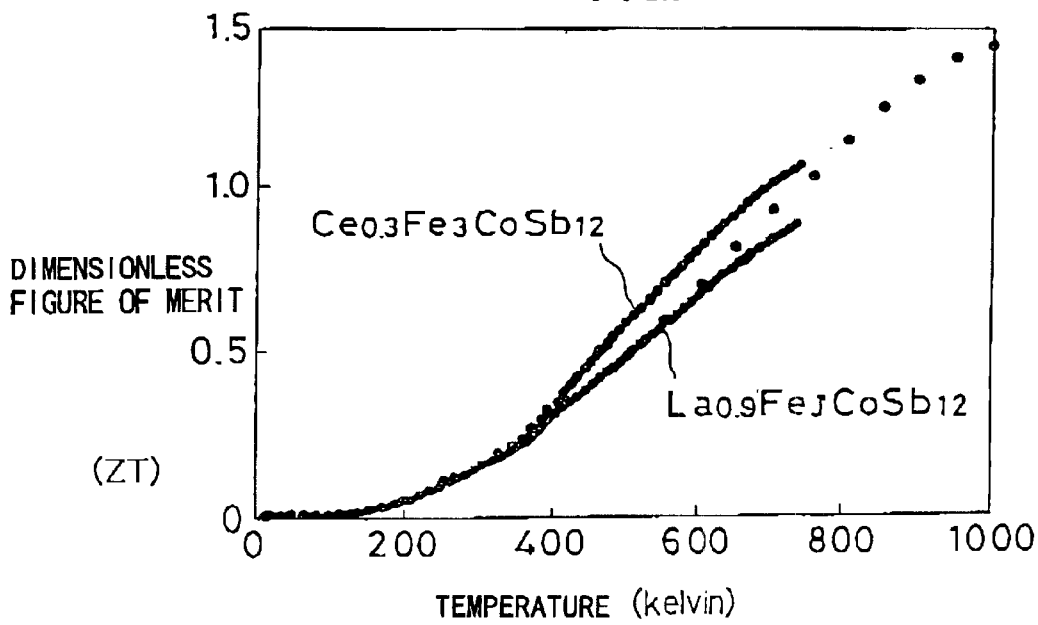
FIG. 4 shows the temperature dependency of a dimensionless figure of merit ZT in a substantially optimized sample of packed skutterudite alloy.

A detailed description will now be given of the power plant according to the present invention, with reference to the accompanying drawings. In the drawings, identical reference numerals denote identical or corresponding parts.

In thermodynamics, "exergy" is also called "available energy", and represents energy which can be utilized including the concept of entropy. Here, in order for the heat engine to create a heat cycle by a difference in temperature between the heat source of the heat engine and the environment, at that time the exergy W is defined as follows:

$$W = Q \cdot (T_H - T_O)/T_H$$

$$=Q \cdot n_C$$

Here, Q is the quantity of heat, $T_H$ is the temperature of the heat source, $T_O$ is the ambient temperature, and $n_C$ is the efficiency of the Carnot cycle.

The maximum efficiency of the heat engine is determined by the efficiency of the Carnot cycle, so the exergy corresponds to the maximum work of the heat engine. Accordingly, this also contributes greatly to the analysis of thermoelectric conversion technology. This is because the electrical output E of the thermoelectric element is written as follows:

$$E = Q \cdot n_C \cdot n_E = W \cdot n_E$$

Here, $n_E$ is the efficiency of the element. In other words, the output of the thermoelectric element is the product of the exergy multiplied by the efficiency determined by the figure of merit and the external circuitry. Accordingly, in order to utilize the thermoelectric conversion element effectively it is fundamentally important to position the thermoelectric conversion elements at positions at which the exergy flux is large. It should be noted that such positions do not necessarily coincide with the locations of large energy (heat) flux.

A description will now be given of embodiments based on the above-described principle.

First Embodiment

Figure 9:
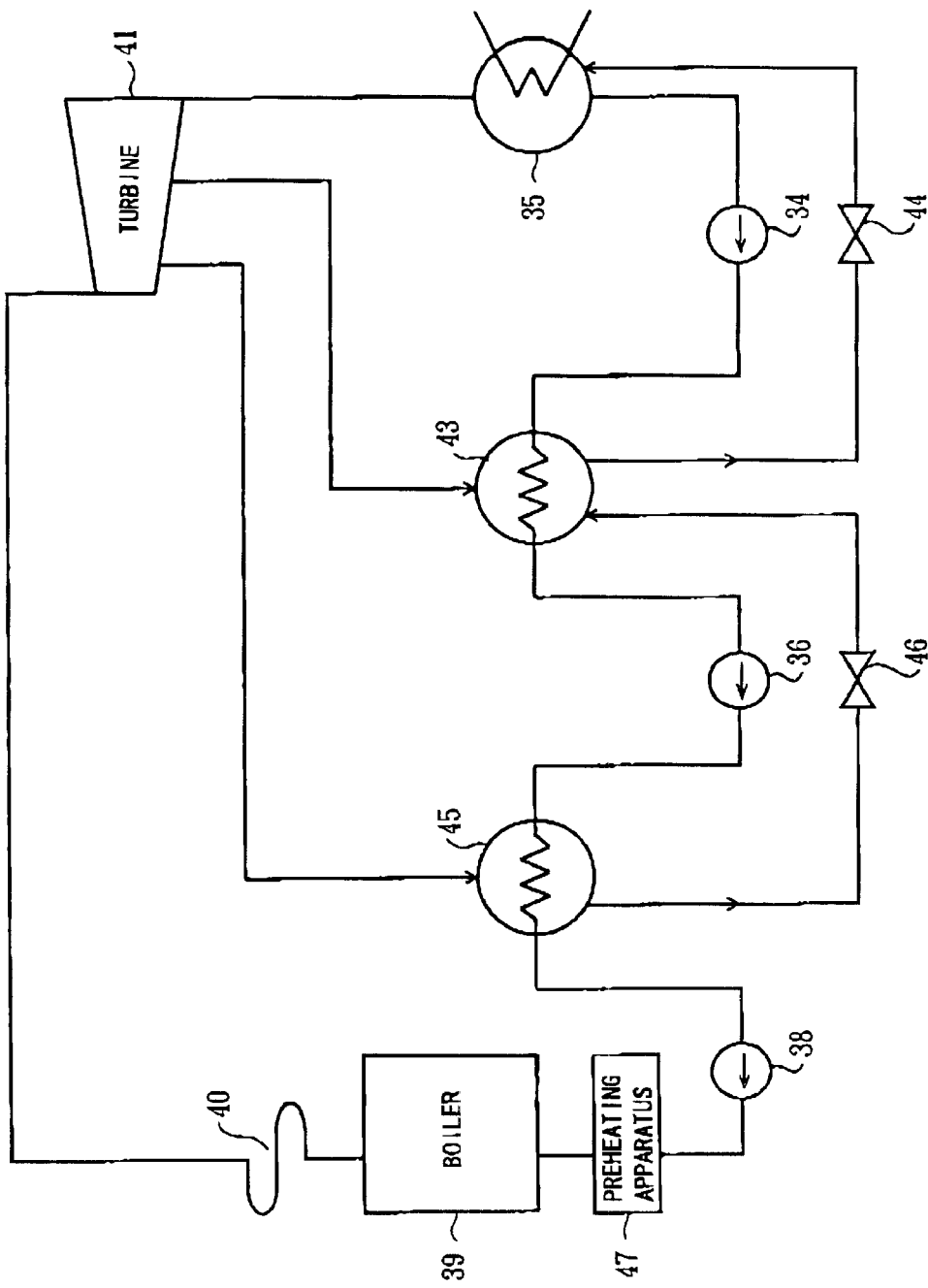
FIG. 9 shows the overall structure of a power plant according to a first embodiment of the present invention.

Referring to FIG. 9, it can be seen that the power plant according to a first embodiment of the present invention includes a boiler 39, a superheater 40 connected to the boiler 39, a turbine 41 connected to the superheater 40, a condenser 35 connected to the turbine 41, a feed water pump 34 connected to the condenser 35, a feed water heater 43 connected to the turbine 41 and feed water pump 34, a feed water pump 36 connected to the feed water heater 43, a feed water heater 45 connected to the turbine 41 and the feed water pump 36, a feed water pump 38 connected to the feed water heater 45, a preheating apparatus 47 connected to the feed water pump 38, a pump 44 that supplies condensed water from the feed water heater 43 to the condenser 35, a pump 46 that supplies condensed water from the feed water heater 45 to the feed water heater 43.

In the power plant described above, pure water from the feed water pumps 34, 36, 38 that has passed through and been heated by the feed water heaters 43, 45 and the preheating apparatus 47 enters a water pipe inside the boiler 39, heat is exchanged between the water and combustion gas, the water turns into high-temperature, high-pressure saturated steam, and further passes through the superheater 40 and becomes high-temperature steam. This high-temperature, high-pressure, superheated steam is sent to the turbine 41, where it hits the blades of the turbine 41 and turns a turbine shaft connected to a power generator not shown in the diagram. The steam emitted from the turbine 41 enters the condenser 35, is cooled by the cooling water and condensed, drawn by the condenser pump 34 and once again sent to the feed water heater 43.

The power plant according to the embodiment of the present invention is characterized by the inclusion of thermoelectric conversion elements on the boiler 39, feed water heaters 43, 45, and preheating apparatus 47, shown in FIG. 9. As a result, energy lost at each part of the power plant is recovered, and the power generating efficiency of the power plant as a whole can be improved. It should be noted, of course, that the prescribed effect of the present invention can be obtained by the inclusion of thermoelectric conversion elements at not all four above-described positions but at at least two such positions.

A description will now be given of a thermoelectric conversion technology using thermoelectric conversion elements.

Figure 10:
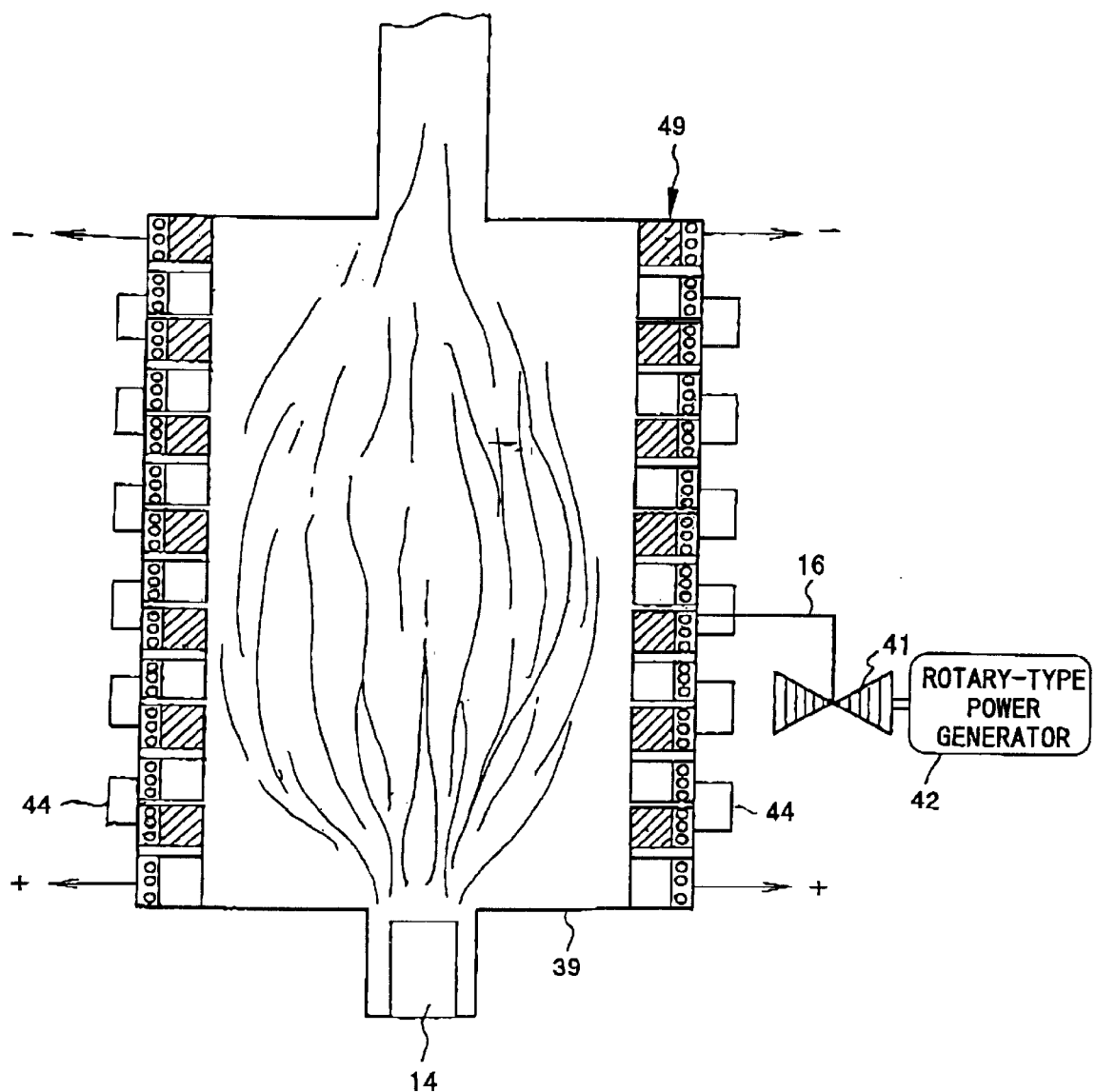
FIG. 10 shows the structure of the boiler shown in FIG. 9.

FIG. 10 shows the structure of the boiler 39 shown in FIG. 9. As shown in FIG. 9, the boiler 39 burns fuel 14 inside a combustion chamber and generates a large amount of heat, although in this case thermoelectric conversion elements 49 are installed around the combustion chamber.

Figure 11:
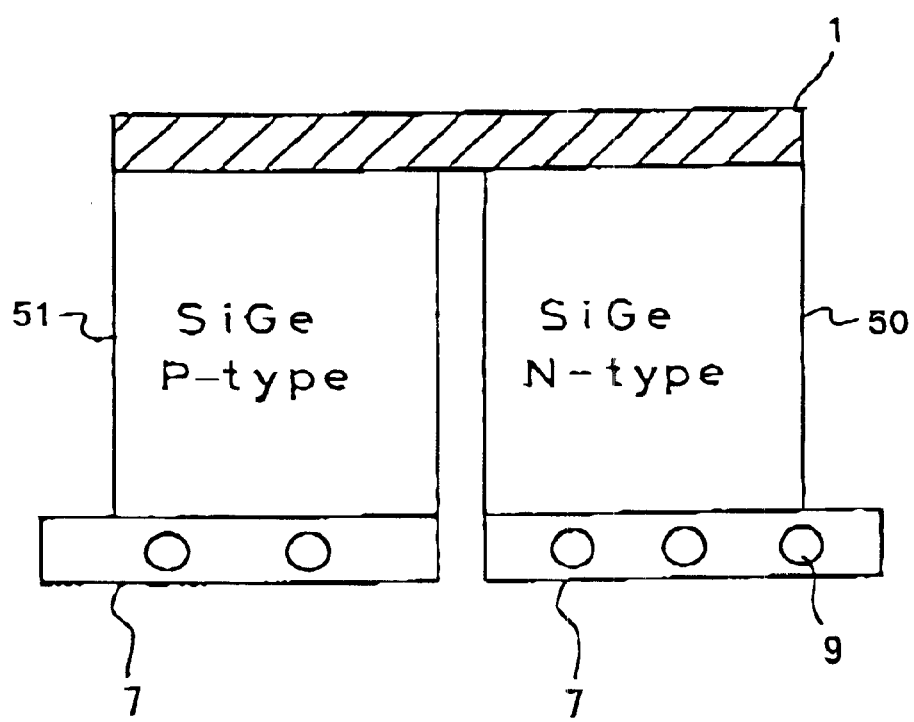
FIG. 11 shows the structure of the thermoelectric conversion element shown in FIG. 10.

FIG. 11 shows the structure of the thermoelectric conversion elements 49 shown in FIG. 10. As shown in FIG. 11, the thermoelectric conversion element 49 includes a heat-collecting metallic plate 1 made from an armor material such as SiC, an N-type thermoelectric material 50 made from N-type SiGe and a P-type thermoelectric material 51 made from P-type SiGe, one end of the thermoelectric materials 50, 51 joined to the heat-collecting metallic plate and electrodes 7 provided on the other ends of the thermoelectric materials 50, 51. It should be noted that a boron-type material can be used instead of SiGe as the semiconductor for the thermoelectric conversion element 49.

Additionally, a through-hole is provided in the electrode 7. A water pipe 9 passes through this through-hole.

As shown in FIG. 10, the thermoelectric conversion element described above is positioned so that the heat-collecting metallic plate 1 faces the inside of the combustion chamber of the boiler 39. As a result, the heat generated inside the boiler 39 causes the temperature of the heat-collecting metallic plate 1 to reach about 1,250° C. Additionally, water supplied from the preheating apparatus 47 flows through the water pipe 9 that penetrates the interior of the electrode 7 and is heated by the heat generated inside the boiler 39 to generate steam 16 having a temperature of 566° C. and a pressure of 250 P (atm), so the temperature of the electrode 7 reaches approximately 650° C. The turbine 41 is operated using the steam 16 generated in the boiler as described above and power is generated by a rotary type power generator 42.

As a result, an electromotive force is generated between the two electrodes 7 shown in FIG. 11, so that, for example, an output voltage can be obtained by connecting a plurality of thermoelectric conversion elements 49 in series by a wire 44 as shown in FIG. 10. It should be noted that although in FIG. 10 the thermoelectric conversion elements 49 are shown positioned along the route of flow of the combustion gas they are not limited to such positioning. Rather, the identical effect can be achieved so long as the thermoelectric conversion elements 49 are installed anywhere along the periphery of the combustion chamber.

Additionally, the slanted line section of the thermoelectric conversion element 49 shown in FIG. 10 represents the N-type thermoelectric material 50.

A description will now be given of the principle of the above-described thermoelectric conversion system with continued reference to FIG. 12. In a power plant having a structure as described above, heat flux not given over to power generation is transmitted to the low-temperature side of the thermoelectric conversion element 49 by thermal conduction, and thus no energy loss occurs. Moreover, the turbine 41 obtains steam of the same temperature and pressure, so the efficiency of the rotary-type power generator 42 does not decline. Accordingly, a portion of the exergy loss in this temperature zone which occurs in the conventional system can be recovered.

Figure 12:
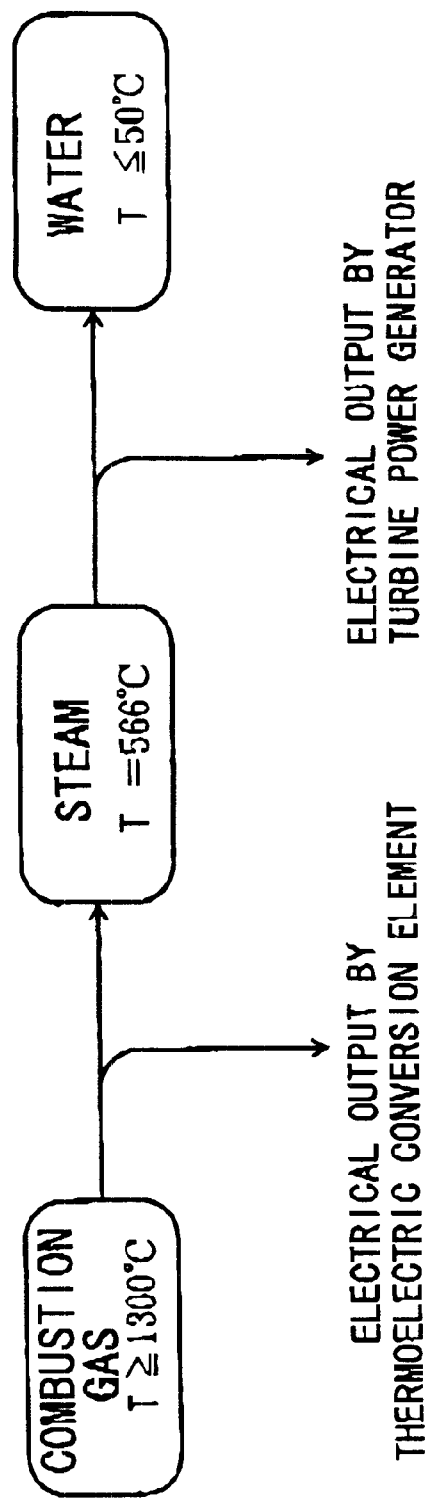
FIG. 12 shows the principle of topping as seen from heat flux and temperature.

The above-described method is called topping, the principle of which is shown in terms of heat flux and temperature in FIG. 12. As shown in FIG. 12, the temperature of the flames and combustion gas in the boiler 39 is assumed to be for example 1,300° C. or above. At the same time, the temperature of the steam is approximately 566° C. even at a pressure of 250 P (atm) or more. Accordingly, the turbine 41 forms a heat cycle of from 566° C. to the 50° C. or less of water. No energy is lost from the 1,300° C. temperature of the flames to the 566° C. temperature of the high-temperature edge steam, but entropy increases and energy decreases, so ultimately the efficiency of the system overall declines. The energy not given over to power generation produces steam and energy conversion is carried out by the rotary-type power generator 42.

The total energy conversion efficiency of the above-described system can be written as follows:

$$E_{off} = E_1 + E_2(1 - E_1)$$

Here, $E_1$=is the thermoelectric conversion efficiency and $E_2$ is the turbine generator efficiency. As an identity this is higher than the respective conversion efficiencies, so in principle it is possible to improve the efficiency of the system as a whole. In other words, by topping, an increase in efficiency of 3–5% can be expected.

More specifically, the thermoelectric conversion efficiency $E_1$ of the thermoelectric conversion element shown in FIG. 11 is approximately 0.056 at optimum operation. Additionally, when for example the temperature of the heat source $T_H$ is 1,100° C. and the temperature of the electrode 7 of the thermoelectric conversion element is 600° C., then the thermoelectric conversion efficiency $E_1$ becomes 0.0796, and the thermoelectric conversion efficiency $E_1$ can be effectively improved by further decreasing the temperature of the electrode 7.

It should be noted that an improvement in exergy efficiency of the boiler 39 can also be expected by increasing the temperature inside the boiler 39.

Figure 13:
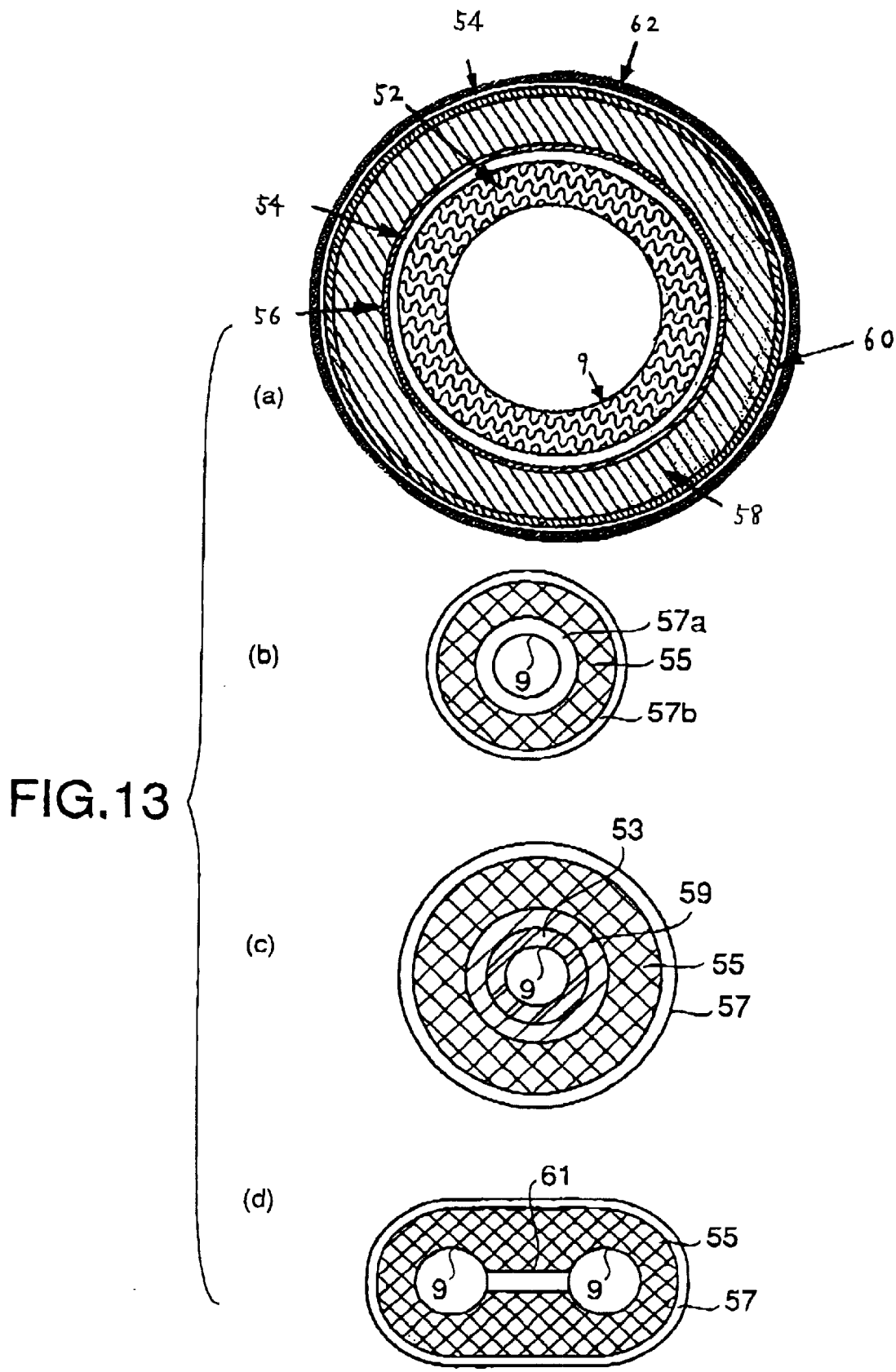
FIG. 13 shows the structure of the water pipe shown in FIG. 11.

Next, a description will be given of the structure of the water pipe 9 shown in FIG. 11, with reference to FIG. 13. The water pipe 9 is made of carbon steel, has an external diameter of 80 mm, a thickness of 9 mm and a coefficient of thermal conductivity of 35 W/m/K. Additionally, as shown in FIG. 13(a), around the outside of the water pipe 9 are wrapped in the following order a heat-transfer pipe 52, electrical insulation 54, a low-temperature electrode 56, a semiconductor 58 made of P-type and N-type thermoelectric material, a high-temperature electrode 60, electrical insulation 54 and armor material 62.

It should be noted that, in addition, a structure like that shown in FIG. 13(b) is also possible, in which an inner casing 57a, heat insulating material 55 and an external casing 57b are wrapped around the outside of the water pipe 9 in that order. Additionally, a structure like that shown in FIG. 13(c) is also possible, in which firebrick 53, high-temperature heat insulating material 59, heat insulating material 55 and a casing 57 are wrapped around the outside of the water pipe 9 in that order.

Additionally, a structure like that shown in FIG. 13(d) is also possible, in which a plurality of water pipes 9 are joined by a fin 61 and the periphery of the whole assembly wrapped in heat insulating material 55 and a casing 57.

By having the above-described structure the temperature gradient between the heat-collecting metallic plate 1 and the electrode 7 of the thermoelectric conversion element shown in FIG. 11 can be maintained with ease, so it is possible to obtain electrical energy more efficiently.

Additionally, although as described above water exhausted from the preheating apparatus 47 is supplied to the water pipe 9 of the electrode 7 on the low-temperature side of the thermoelectric conversion element 49, it is also possible to directly supply water from the feed water heaters 43, 45 or from the condenser 35.

It should be noted that the above-described thermoelectric conversion technology is currently under study for use in generating power using garbage or for use in the wastewater components of thermal power plants.

Figure 14:
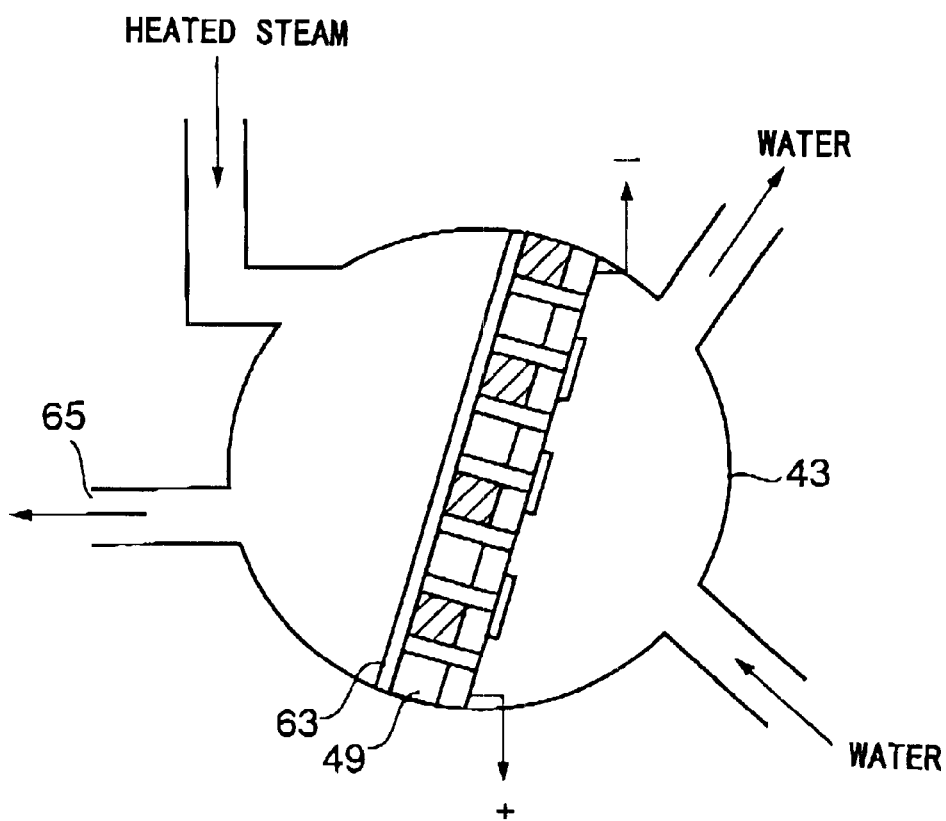
FIG. 14 shows the structure of the feed water heater shown in FIG. 9.

Next, a description will be given of the application of thermoelectric conversion technology to the feed water heaters 43, 45 shown in FIG. 9. FIG. 14 shows the structure of the feed water heater 43. Feed water heater 45 has an identical structure. As shown in FIG. 14, a diaphragm 63 is provided in the interior of the feed water heater 43, with thermoelectric conversion elements 49 provided on the diaphragm 63.

The feed water heater 43 is an apparatus that recovers energy by exchanging heat between and ultimately mixing low-temperature, low-pressure water (that is, water at ordinary temperature and under approximately 0.03 P (atm) of pressure) from the condenser 35 with high-pressure, high-temperature water (sometimes also including steam from the boiler 39) from the turbine 41. Accordingly, the feed water heaters 43, 45 are good energy recovery apparatuses, and in principle there is no energy loss. However, when media of differing temperatures and pressures are mixed together entropy is produced in the process, so energy loss does occur leading to a decrease in efficiency.

From the foregoing the meaning of including the thermoelectric conversion elements 49 in the feed water heaters 43, 45 as described above can be appreciated. In other words, the idea is to provide a structure that generates power using a temperature difference before water of two different temperatures is mixed together.

More specifically, heat of approximately 300° C. from high-temperature heated steam led from the boiler 39 is supplied to the heat-collecting metallic plate 1 of the thermoelectric conversion element shown in FIG. 11, and this heat is taken from the electrode 7 by the ordinary-temperature water supplied from the condenser 35.

According to the method described above, although the amount of heat of the water decreases by an amount by which power generation is performed, electrical energy is generated, so ultimately the total conversion efficiency of the power plant overall increases by an additional 1–2%.

Further, the operating media of the above-described feed water heater 43, 45 is a liquid, so the coefficient of thermal conductivity is higher than is the case with a gas. As a result, the thermoelectric apparatus can be made more compact and its cost can be decreased.

It should be noted that medium-temperature material such as BiTe and PbTe may be used as the thermoelectric semiconductor.

Additionally, although in FIG. 14 the condensed water is led to the condenser 35 via an outlet 65, as shown in FIG. 9, with respect to the feed water heater 45 the condensed water is led to the feed water heater 43 via the outlet 65.

Figure 15:
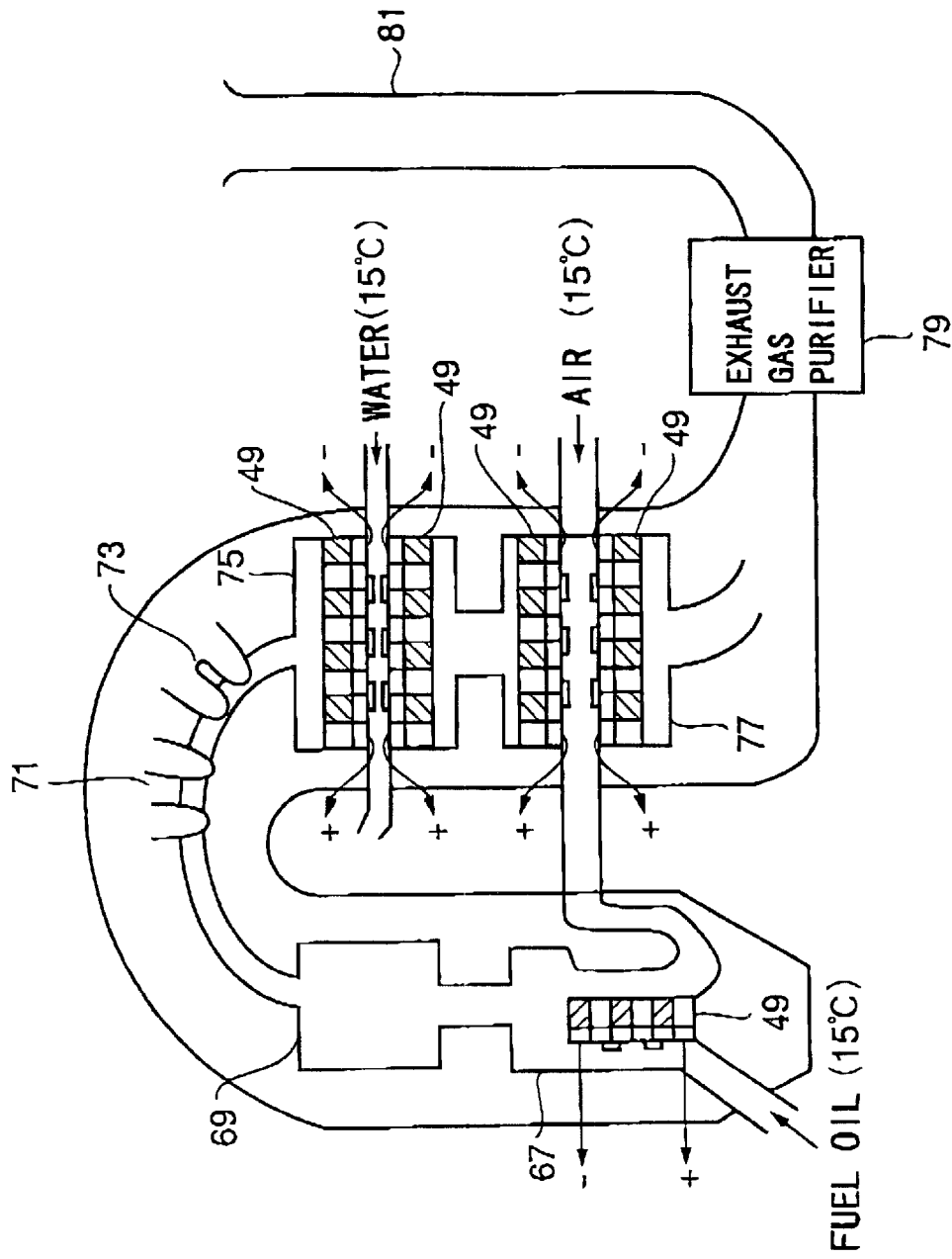
FIG. 15 shows the overall structure of the preheating apparatus shown in FIG. 9.

Next, a description will be given of the application of thermoelectric conversion technology to the preheating apparatus shown in FIG. 9. FIGS. 15 shows the overall structure of the preheating apparatus 47. As shown in FIG. 15, the preheating apparatus 47 includes a mixing chamber 67 in which fuel oil and heated air are mixed, a fuel oil combustion chamber 69 connected to the mixing chamber 67, a superheater 71 to which combustion gas exhausted from the fuel oil combustion chamber 69 is led, a reheater 73 to which combustion gas is led via the superheater 71, an economizer that preheats 15° C. water supplied from the pump 38 shown in FIG. 9 to under saturated steam temperature and supplies it to the boiler 39, an air preheater 77 that preheats air supplied at 15° C. to 250° C., an exhaust gas purifier 79 that purifies combustion gas exhausted from the air preheater 77, a smokestack 81 connected to the exhaust gas purifier 79, and thermoelectric conversion elements 49.

It should be noted that these thermoelectric conversion elements 49 have the same structure as the thermoelectric conversion element shown in FIG. 11 and will be described later.

A description will now be given of the fuel oil combustion process of the preheating apparatus 47. Initially, fuel oil having a temperature of 15° C. and preheated air having a temperature of 250° C. is mixed in the mixing chamber and mixed gas having a temperature of 500° C. is produced. Next, this mixed as passes through 1,500° C. thermal cracking combustion and incandescent combustion (theoretical combustion temperature 2,000° C.) in the combustion chamber 69 and is exhausted from the combustion chamber 69 at a temperature of 1,000–1,300° C.

Further, the combustion gas exhausted from the combustion chamber 69 passes through the superheater 71 and the reheater 73 and is led to the economizer 75 at a temperature of 500° C. Here, after the 500° C. combustion gas supplies heat to the 15° C. water supplied by the economizer 75, the combustion gas drops to a temperature of 300° C. and is led to the air preheater 77.

Then, this 300° C. combustion gas, after preheating the 15° C. air supplied to the air preheater 77, drops to a temperature of 200–160° C. and enters the exhaust gas purifier 79. Then, the combustion gas is purified by the exhaust gas purifier 79 and exhausted to the outside via the smokestack 81.

It should be noted that the air preheated to a temperature of 250° C. at the air preheater 77 is led to the mixing chamber 67.

Next, a description will be given of thermoelectric conversion elements 49 included at three positions on the above-described preheating apparatus 47.

First, a thermoelectric conversion element 49 is installed in the mixing chamber 67. However, heat from 250° C. air supplied from the air preheater 77 is supplied to the high-temperature side of the heat-collecting metallic strip 1 of this thermoelectric conversion element 49 and heat is taken away at the low-temperature side electrode 7 by the 15° C. fuel oil. Accordingly, this thermoelectric conversion element 49 uses the difference in temperature between the temperature of the preheated air and the temperature of the fuel oil to recover lost exergy, thus improving the power generating efficiency of the power plant as a whole.

It should be noted that, although not shown in the drawings, water exhausted from the feed water heaters 43, 45 may be used to supply heat to the above-described fuel oil. In this case, heat is supplied to the high-temperature side of the heat-collecting metallic plate 1 of the thermoelectric conversion elements 49 from the water exhausted from the feed water heaters 43, 45.

Next, a thermoelectric conversion element 49 is installed in the economizer 75. However, heat from 500° C. combustion gas that has passed through the reheater 73 is supplied to the high-temperature side of the heat-collecting metallic plate 1 of this thermoelectric conversion element 49 and heat is taken away at the low-temperature side electrode 7 by the 15° C. water. Accordingly, as with the thermoelectric conversion element 49 described above, this thermoelectric conversion element 49 uses the difference in temperature between the temperature of the combustion gas and the temperature of the water to recover lost exergy, thus further improving the power generating efficiency of the power plant as a whole.

Additionally, a thermoelectric conversion element 49 is installed in the air preheater 77. However, heat from 300° C. combustion gas supplied from the economizer 75 is supplied to the high-temperature side of the heat-collecting metallic plate 1 of this thermoelectric conversion element 49 and heat is taken away at the low-temperature side electrode 7 by the 15° C. air. Accordingly, like the thermoelectric conversion element 49 described above, this thermoelectric conversion element 49 uses the difference in temperature between the temperature of the combustion gas and the temperature of the air supplied to the air preheater 77 to recover lost exergy, thus further improving the power generating efficiency of the power plant as a whole.

Although the above is a description of the power plant shown in FIG. 9, in fact the thermoelectric conversion technology described above can be similarly applied to the carburetor of an LNG thermal power plant system, in other words, a system in which liquid, low-temperature LNG (in which methane is the chief component, with a boiling point of minus 161° C.) is vaporized in a carburetor using seawater and led to the boiler shown in FIG. 9.

In other words, LNG has a carburetor operating temperature range of from ordinary temperature to about 170° C. and at the same time has a substantially constant media temperature prior to vaporization because it is transported as a liquid and has latent heat, so LNG is easy to use in thermoelectric conversion technology.

Figure 16:
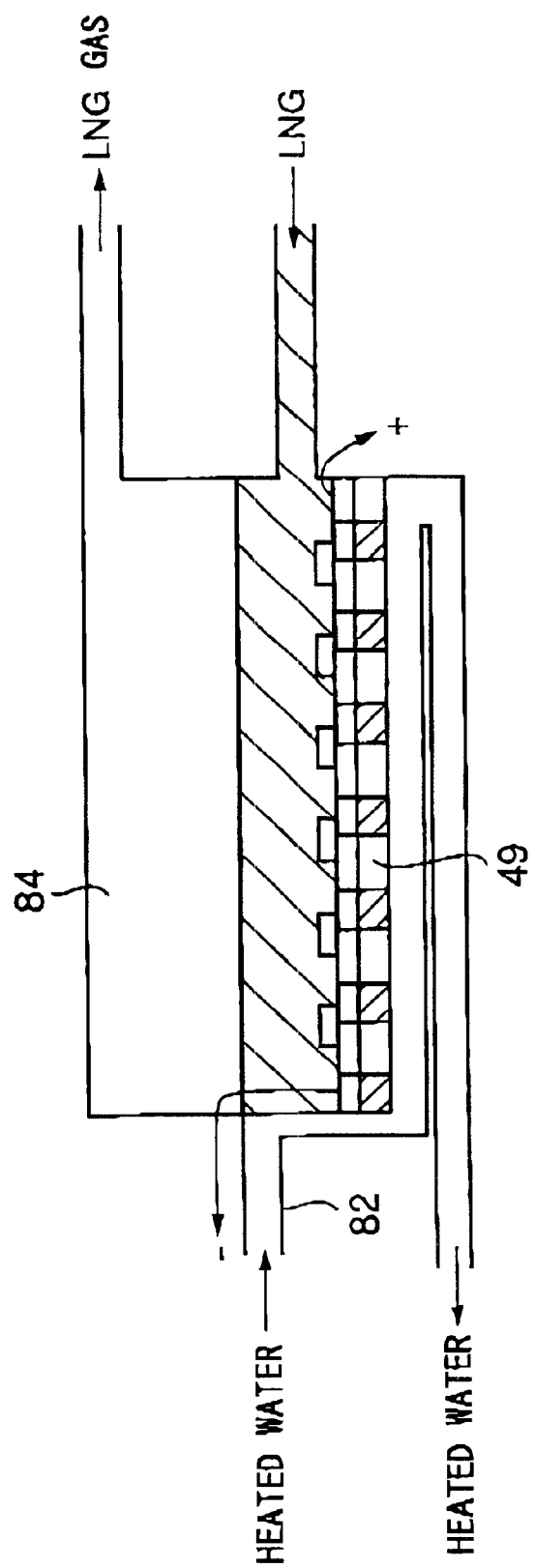
FIG. 16 shows the structure of the carburetor included in the thermoelectric conversion element.

FIG. 16 shows the structure of the carburetor included in the thermoelectric conversion element. As shown in FIG. 16, this carburetor has a vaporization chamber 84 to which liquid LNG is supplied, a distribution pipe 82 provided beneath the vaporization chamber 84 through which is fed heated water exhausted from feed water heaters 43, 45 and the condenser 35, and a thermoelectric conversion element 49 provided between the vaporization chamber 84 and the distribution pipe 82.

It should be noted that the thermoelectric conversion element 49 has the same structure as the thermoelectric conversion element 49 shown in FIG. 11. However, the use of BiTe-type or BiSb-type material is preferable.

In the carburetor as described above, the liquid LNG inside the vaporization chamber 84 takes heat from the heated water that passes through the distribution pipe 82 and is turned into a gas, thus producing LNG gas.

The thermoelectric conversion element 49 installed on the carburetor as described above receives heat at the high-temperature side of the heat-collecting metallic plate 1 from the heated water passing through the distribution pipe 9 and loses heat to the approximately minus 170° C. LNG at the low-temperature side electrode 7. As a result, the flow of exergy is recovered by the difference in temperature between the heated water and the liquid LNG and electric power is produced.

The application of thermoelectric conversion technology to a carburetor as described above presupposes a heat cycle between the temperature of the heated water and the temperature of the liquid LNG, so the difference in temperature is small compared to that of an operation in the high-temperature zone. However, from the standpoint of exergy utilization its value cannot be overlooked and it presents a certain advantage. It should be noted that, as described above, by including a thermoelectric conversion element made of existing BiTe-type material in the carburetor, the overall efficiency of the thermal power plant increases by approximately 0.4%.

It should be noted that in order to vaporize the liquid LNG it is possible to feed ordinary-temperature seawater to the carburetor. However, using water exhausted from the feed water heaters 43, 45 and condenser 35 allows more heat to be gained, thus making it possible to make the carburetor smaller and hence reduce costs. Additionally, there is the advantage of an increase in the electromotive force generated by the installed thermoelectric conversion element 49.

According to the power plant according to the first embodiment as described above, the exergy hitherto conventionally lost can be recovered, so it is possible to achieve an additional increase in power generating efficiency. In other words, efficiency rivaling that of power plants employing combined cycle power generation using high-speed rotary gas turbines can be achieved, as can marked reductions in facilities costs and maintenance and repair costs.

Additionally, according to the power plant according to the first embodiment, by increasing or decreasing the number of thermoelectric conversion elements installed a power plant suited to required output can be obtained.

Second Embodiment

Figure 5:
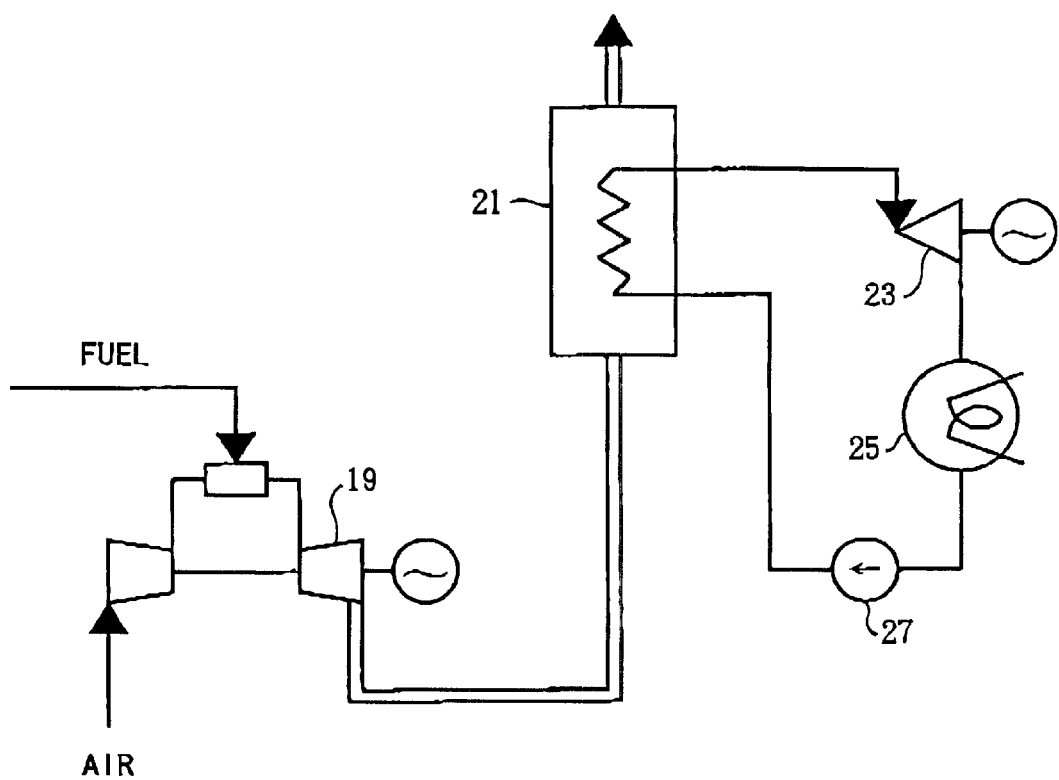
FIG. 5 is a diagram for illustrating the combined cycle power generating system of the conventional exhaust heat recovery type.
Figure 17:
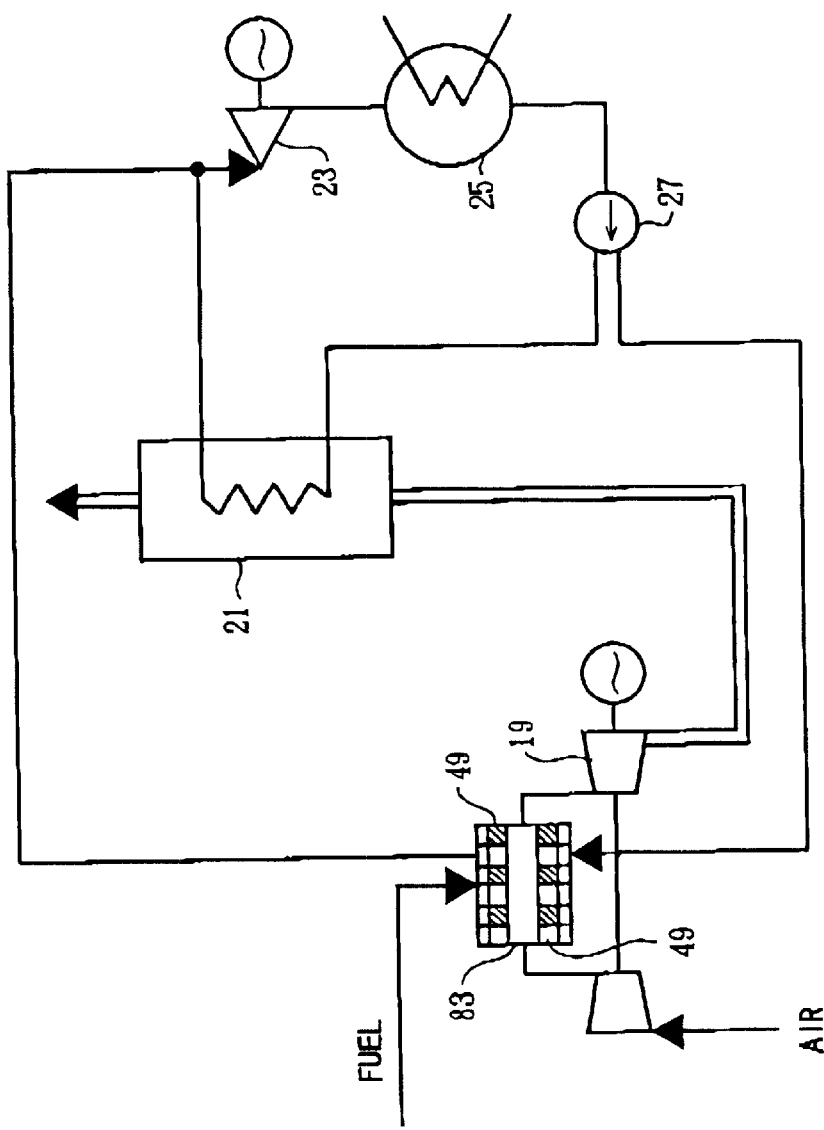
FIG. 17 shows the overall structure of the power plant according to a second embodiment of the present invention.

Referring to FIG. 17, the power plant according to a second embodiment of the present invention employs the same type of conventional non-heat-recovery type combined cycle power generating system as shown in FIG. 5, with the difference that a thermoelectric conversion element 49 is installed on the combustor 83 of the gas turbine.

This thermoelectric conversion element 49 has the same structure as the thermoelectric conversion element 49 shown in FIG. 11, with heat generated inside the combustor 83 being supplied to the high-temperature side heat-collecting metallic plate 1 and heat being taken away at the low-temperature side electrode 7 by water supplied from the feed water pump 27.

Accordingly, this thermoelectric conversion element 49 recovers lost exergy using the difference in temperature between the temperature inside the combustor 83 and the temperature of the water supplied from the feed water pump 27, thereby further improving the overall power generating efficiency of a power plant employing a non-heat-recovery type combined cycle power generating system.

It should be noted that in the power plant according to the second embodiment as described above, the low-temperature side of the electrode 7 of the thermoelectric conversion element 49 may be supplied directly with condensed water from the condenser 25 instead of the supply pump 27.

Figure 18:
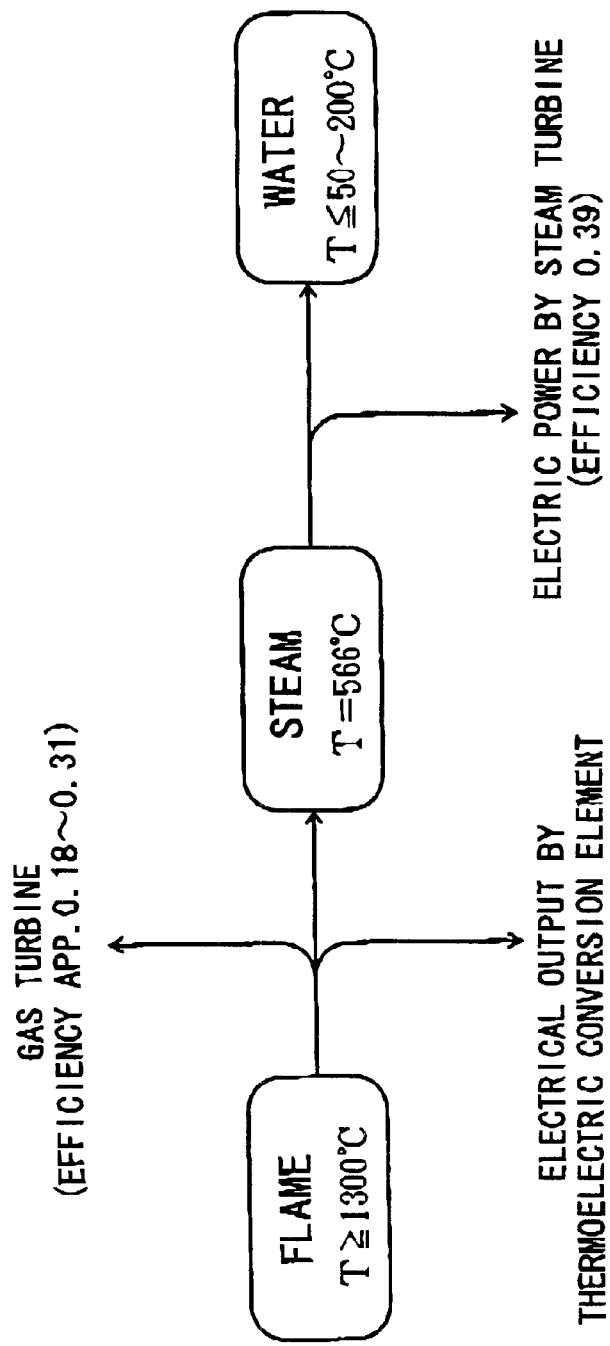
FIG. 18 is a diagram for illustrating energy conversion in a power plant adapting the combined cycle power generating system according to the second embodiment of the present invention.

FIG. 18 is a diagram for illustrating energy conversion in a power plant adapting the combined cycle power generating system according to the second embodiment of the present invention. As shown in FIG. 18, the temperature of the flames inside the combustor 83 of the gas turbine is approximately 1,100° C. while the maximum temperature of the steam acting on the steam turbine 23 is approximately 566° C. Additionally, the steam turbine 23 forms a heat cycle of from 566° C. to at or below from 200° C. to 50° C.

When the gas turbine 19 alone runs the power generator the heat efficiency is approximately 0.18–0.31, with the heat efficiency of the steam turbine 23 being approximately 0.39. It should be noted that despite the gas turbine 19 itself having a heat efficiency lower than the heat efficiency of the steam turbine 23, the gas turbine is used for certain purposes because its operating temperature range differs from that of the steam turbine 23.

The thermoelectric conversion element 49 installed on the combustor 83 as described above generates electric power by recovering the flow of exergy caused by the difference in temperature between the temperature inside the combustor 83 and the temperature of the steam in the steam turbine 23. It should be noted that, more specifically, it is preferable that the thermoelectric conversion element 49 be installed between the outlet of the combustor 83 and the blades of the gas turbine 19.

Accordingly, according to the power plant of the second embodiment of the present invention the exergy conventionally lost in the combined cycle power generating system can be recovered and power generating efficiency can be further improved.

It should be noted that, although the heat efficiency of the thermoelectric conversion element 49 is lower than the heat efficiency of the gas turbine 19, it has certain advantages. That is, generating power using the thermoelectric conversion element 49 does not require vaporizing fuel and so a solid such as coal can be used as the thermal energy source. Additionally, the thermoelectric conversion element 49 can be composed of static parts, thus simplifying maintenance. Further, although the mechanical strength of the turbine blades will become a major problem when the operating temperature of the gas turbine in the future becomes higher than it is at present, such a problem does not arise in the generation of power using the thermoelectric conversion element 49.

Third Embodiment

Figure 6:
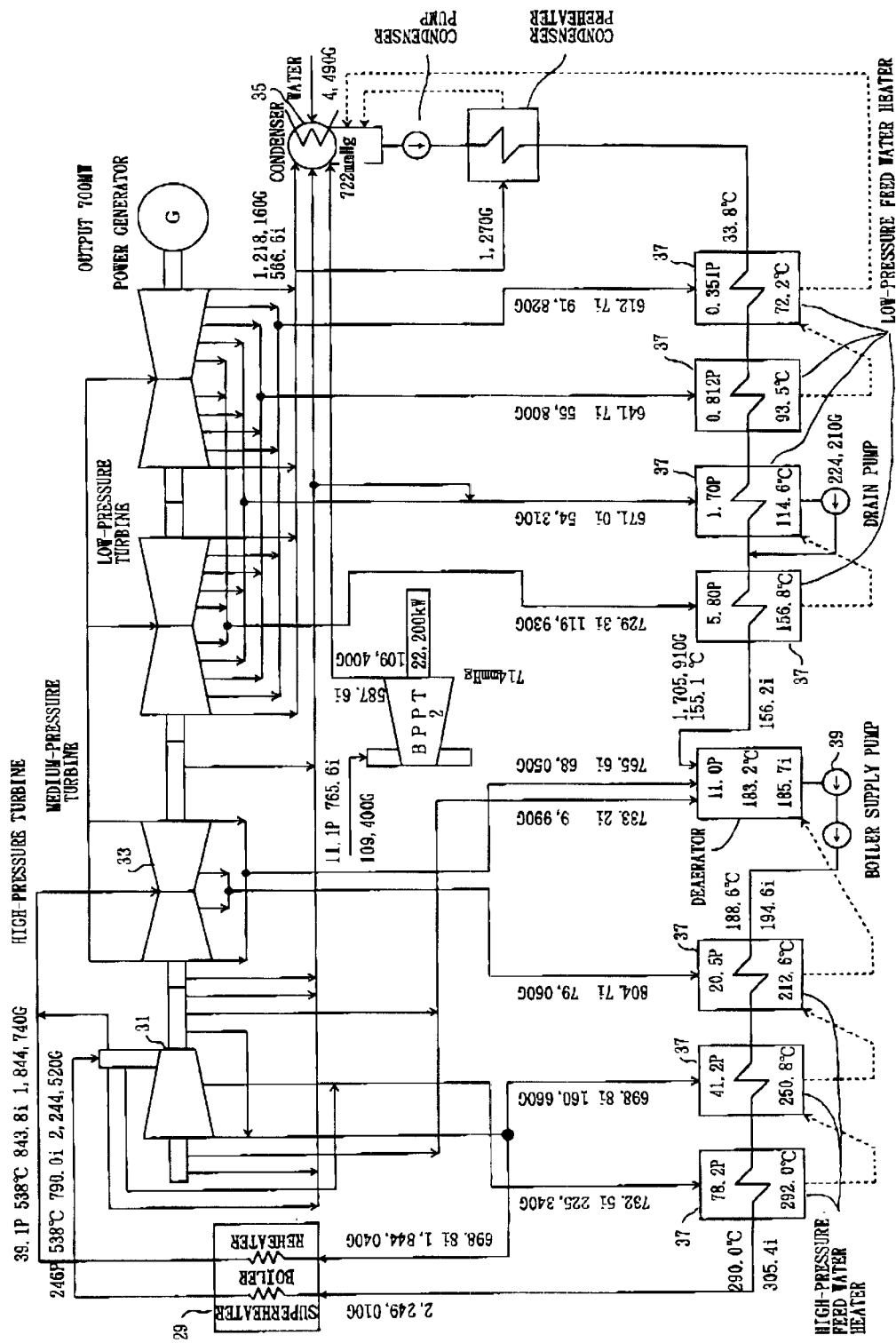
FIG. 6 is a heat balance diagram of an actual thermal power plant system utilizing this reheating cycle.
Figure 7:
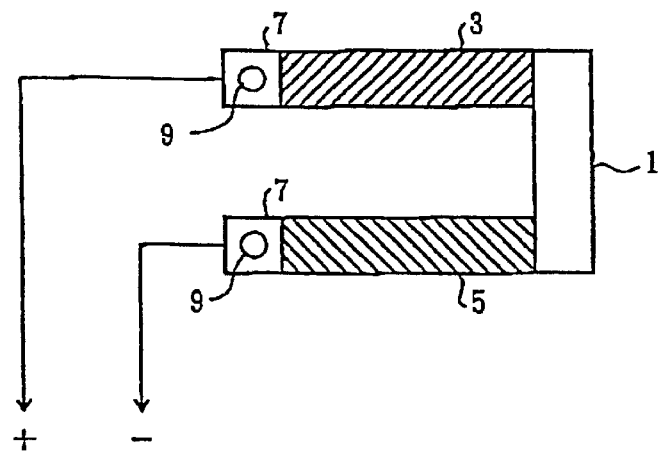
FIG. 7 is a diagram for illustrating the conventional thermoelectric conversion element.
Figure 8:
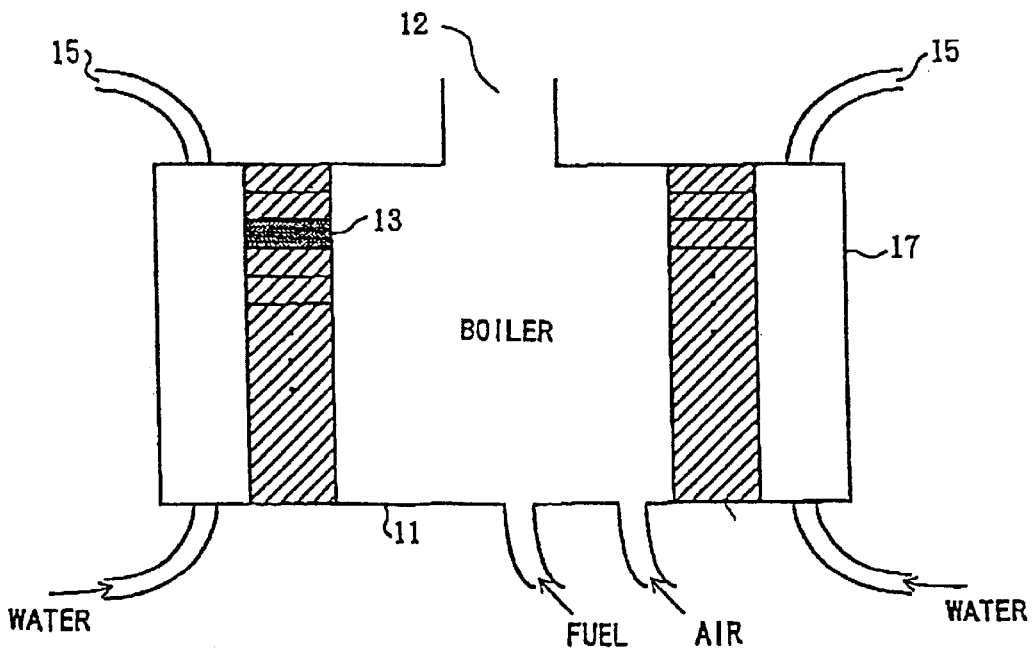
FIG. 8 shows the structure of a conventional thermal power plant in which the thermoelectric conversion element shown in FIG. 7 has been included.
Figure 19:
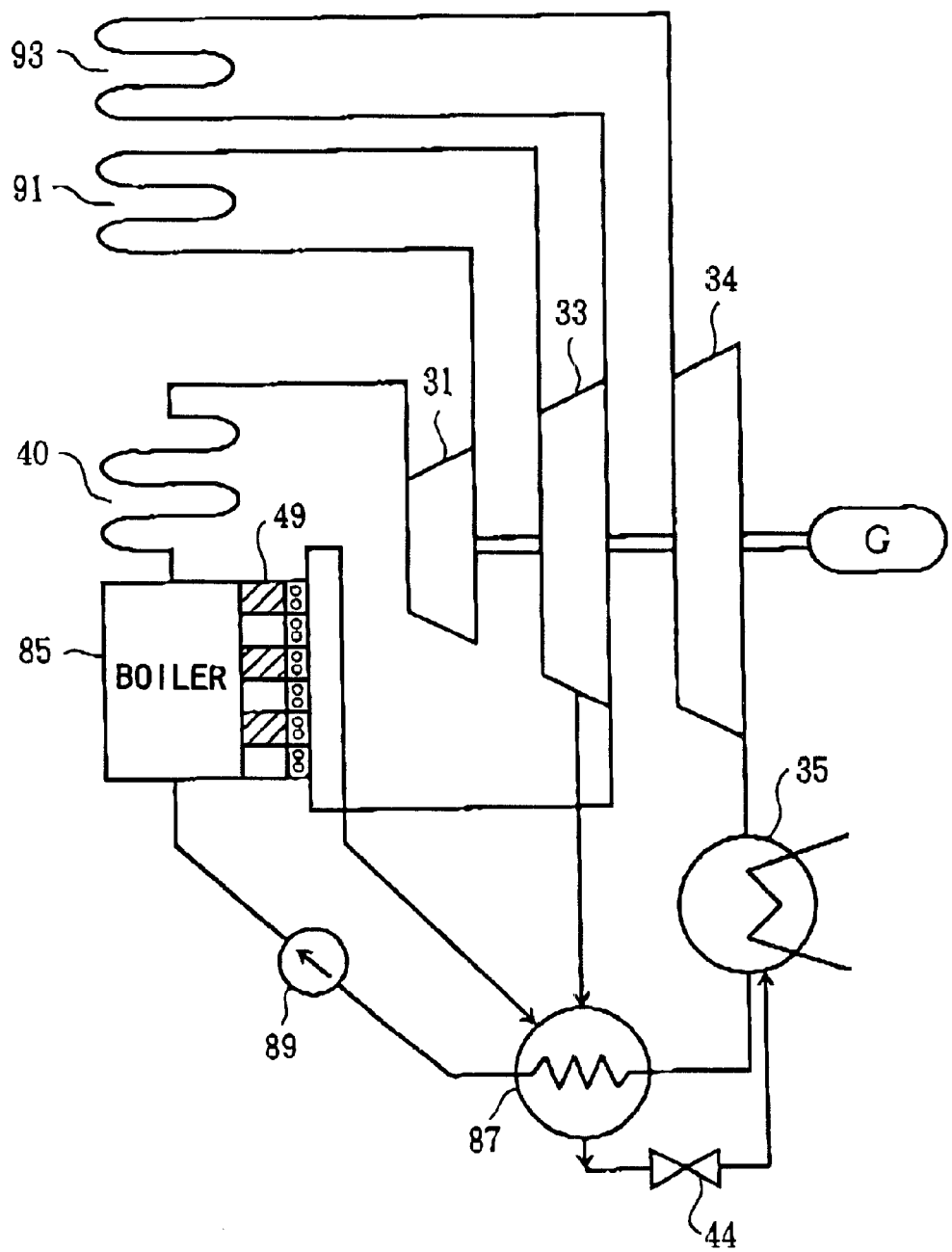
FIG. 19 shows the overall structure of the power plant according to a third embodiment of the present invention.

Referring to FIG. 19, it can be seen that the power plant according to a third embodiment of the present invention has high-, medium- and low-pressure turbines 31, 33 and 34, respectively, each with a different operating pressure range, and the same structure as the power plant shown in FIG. 6. The difference is that a thermoelectric conversion element 49 is installed on the boiler 85, with water and steam exhausted from the medium-pressure turbine 33 being supplied to the low-temperature electrode 7.

It should be noted that the thermoelectric conversion element 49 installed on the boiler 85 has the same structure as the thermoelectric conversion element 49 shown in FIG. 11. Additionally, steam generated inside the water pipe 9 is led to the feed water heater 87 to preheat the condensed water supplied from the condenser 35.

The thermoelectric conversion element 49 installed on the boiler 85 generates electric power by recovering the flow of exergy caused by the difference in temperature between the temperature inside the boiler 85 and the temperature of the water or steam exhausted from the medium-pressure turbine 33.

Accordingly, according to the power plant of the third embodiment of the present invention the exergy conventionally lost in a power plant having a plurality of steam turbines of different operating pressure ranges can be recovered and power generating efficiency can be further improved.

It should be noted that although in the power plant according to the third embodiment as described above water or steam exhausted from the medium-pressure turbine 33 is supplied to the low-temperature side electrode 7, instead water or steam exhausted from the low-pressure turbine 34 may be similarly supplied.

Additionally, high-temperature, high-pressure water exhausted from the medium-pressure turbine 33 or the low-pressure turbine 34 may be similarly supplied to the high-temperature side heat-collecting metallic strip 1 of the thermoelectric conversion element 49, with water exhausted from the condenser 35 or the feed water heater 87 being similarly supplied to the low-temperature side electrode 7. It should be noted that, in that case, the water supplied to the low-temperature side electrode 7 is led once again to the feed water heater 87.

Additionally and further, it is also possible to supply water existing in the natural environment, such as seawater or fresh water, to the low-temperature side electrode 7. By doing so, the temperature of the electrode 7 can be maintained at the temperature of the water of the natural environment.

What is claimed is:

1. A power plant for generating power using the thermal energy of combustion gas or steam, in which thermoelectric conversion elements are provided at at least two locations having different temperatures.

2. A power plant comprising:
   a boiler that heats pressurized water in a combustion chamber to produce steam;
   a turbine connected to said boiler that generates electricity by a work of said steam;
   a condenser connected to said turbine that cools and condenses the steam emitted from said turbine;
   a feed water heater that preheats water supplied to said boiler from said condenser by using a part of said steam put to work in said turbine;
   a first thermoelectric conversion element installed around said combustion chamber of the boiler and that generates electric power by using a difference in temperature between a temperature of an interior of the combustion chamber and a temperature of the water exhausted from either said feed water heater or said condenser; and
   a second thermoelectric conversion element installed on said feed water heater and that generates electric power by using a difference in temperature between a temperature of the part of said steam supplied from said turbine and a temperature of said water supplied from said condenser.

3. The power plant as claimed in claim 2, further comprising:
   preheating means provided between said feed water heater and said boiler for preheating said pressurized water supplied to said boiler; and
   a third thermoelectric conversion element installed on said preheating means and that generates electric power by using the difference in temperature between a temperature of combustion gas supplied from said combustion chamber for preheating said pressurized water and a temperature of said pressurized water supplied to said preheating means.

4. The power plant as claimed in claim 3, further comprising;
   an air preheater that preheats air supplied to an inside of said combustion chamber; and
   a fourth thermoelectric conversion element installed on said air preheater that generates electric power by using a difference in temperature between a temperature of air supplied to said air preheater and a temperature of combustion gas supplied from said combustion chamber for preheating said air.

5. The power plant as claimed in claim 4, further comprising:
   a fifth thermoelectric conversion element that generates electric power by using a difference in temperature between a temperature of fuel supplied to said combustion chamber and the temperature of either air preheated by said air preheater or water exhausted from said feed water heater.

6. The power plant as claimed in claim 2, wherein said first thermoelectric conversion element comprises:
   a first electrode provided so as to face an inside of said combustion chamber;
   an N-type semiconductor, one end of which is joined to said first electrode;
   a P-type semiconductor, one end of which is joined to said first electrode;
   a second electrode provided on the other ends of said N-type semiconductor and said P-type semiconductor;
   a water pipe running from said feed water heater to said turbine and installed so as to penetrate said second electrode; and
   a heat insulator wrapped around said water pipe.

7. The power plant as claimed in claim 2, further comprising:
   a carburetor that vaporizes liquefied LNG and supplies the LNG to said boiler; and
   a third thermoelectric conversion element provided on said carburetor and that generates electric power by using a difference in temperature between a temperature of said LNG and a temperature of water led to said carburetor in order to vaporize said LNG.

8. A power plant having a plurality of steam turbines with different operating pressure ranges, the power plant comprising:
   a boiler that heats pressurized water inside a combustion chamber to generate steam; and
   a first thermoelectric conversion element installed around said combustion chamber of said boiler and that generates electric power by using a difference in temperature between a temperature of an interior of said combustion chamber and a temperature of either water or steam exhausted from any one of said steam turbines.

9. The power plant as claimed in claim 8, further comprising:
   a condenser connected to said steam turbines that cools and condenses steam emitted from said steam turbines;
   a feed water heater that preheats water supplied to said boiler from said condenser by using a part of said steam to work in said steam turbines; and
   a second thermoelectric conversion element that generates electric power by using a difference in temperature between a temperature of steam emitted from said steam turbines and a temperature of water exhausted from either said condenser or said feed water heater.

10. The power plant as claimed in claim 9, wherein water or steam exhausted from any one of said steam turbines and which has taken heat from said first thermoelectric conversion element is again led to said feed water heater.

11. The power plant as claimed in claim 9, wherein said steam that has imparted heat to said second thermoelectric conversion element is led to said condenser.

12. The power plant as claimed in claim 9, wherein said second thermoelectric conversion element is made from PbTe-type or CoSb-type material.

* * * * *

UNITED STATES PATENT AND TRADEMARK OFFICE
CERTIFICATE OF CORRECTION

PATENT NO. : 6,269,645 B1
DATED : August 7, 2001
INVENTOR(S) : Satarou Yamaguchi It is certified that error appears in the above-identified patent and that said Letters Patent is hereby corrected as shown below:

Column 15,
Line 14, please delete Claim 1 and insert:
-- 1.  A power plant for generating electric power by using the thermal energy of combustion gas or steam, comprising:
    a first thermoelectric conversion element installed around a combustion chamber of a boiler and generating electric power by using a difference in temperature between a temperature of an interior of the combustion chamber and a temperature of water exhausted form either a feed water heater or a condenser; and
    a second thermoelectric conversion element installed on the feed water heater and generating electric power by using a difference in temperature between a temperature of steam supplied from a turbine and a temperature of water supplied from the condenser. --

Column 16,
Line 31, please delete Claim 8 and insert:
-- 8.  A power plant having a plurality of steam turbines with different operating pressure ranges, condenser connected to the steam turbines, and a feed water heater associated with the steam turbines and the condenser, the power plant comprising:
    a boiler that heats pressurized water inside a combustion chamber to generate steam;
    a first thermoelectric conversion element installed around said combustion chamber of said boiler and generating electric power by using a difference in temperature between a temperature of an interior of said combustion chamber and a temperature of either water or steam exhausted from any one of the plurality of steam turbines; and
    a second thermoelectric conversion element installed on said feed water heater and generating electric power by using a difference in temperature between a temperature of steam supplied from the plurality of steam turbines and a temperature of water exhausted from either the condenser or the feed water heater. --

UNITED STATES PATENT AND TRADEMARK OFFICE
CERTIFICATE OF CORRECTION

PATENT NO. : 6,269,645 B1
DATED : August 7, 2001
INVENTOR(S) : Satarou Yamaguchi It is certified that error appears in the above-identified patent and that said Letters Patent is hereby corrected as shown below:

<u>Column 16 (con't),</u>
Line 43, please delete Claim 9 and insert therefor:
-- 9. A power plant having a plurality of steam turbines with different operating pressure ranges, the power plant comprising:
    a boiler that heats pressurized water inside a combustion chamber to generate steam;
    a first thermoelectric conversion element installed around said combustion chamber of said boiler and generating electric power by using a difference in temperature between a temperature of an interior of said combustion chamber and a temperature of either water or steam exhausted from any one of the plurality of steam turbines;
    a second thermoelectric conversion element installed on said feed water heater and generating electric power by using a difference in temperature between a temperature of steam supplied from the plurality of steam turbines and a temperature of water exhausted from either the condenser or the feed water heater; and
    a condenser connected to said steam turbines that cools and condenses steam emitted from said steam turbines;
a feed water heater that preheats water supplied to said boiler from said condenser by using a part of said steam to work in said steam turbines; and
    a second thermoelectric conversion element that generates electric power by using a difference in temperature between a temperature of steam emitted from said steam turbines and a temperature of water exhausted from either said condenser or said feed water heater. --

Signed and Sealed this

Twenty-second Day of October, 2002

*Attest:*

*Attesting Officer*

JAMES E. ROGAN
*Director of the United States Patent and Trademark Office*